Sept. 15, 1953 N. M. GRALENSKI 2,651,859
TRACTOR DITCH DIGGING ATTACHMENT
Filed Nov. 29, 1950 3 Sheets-Sheet 1
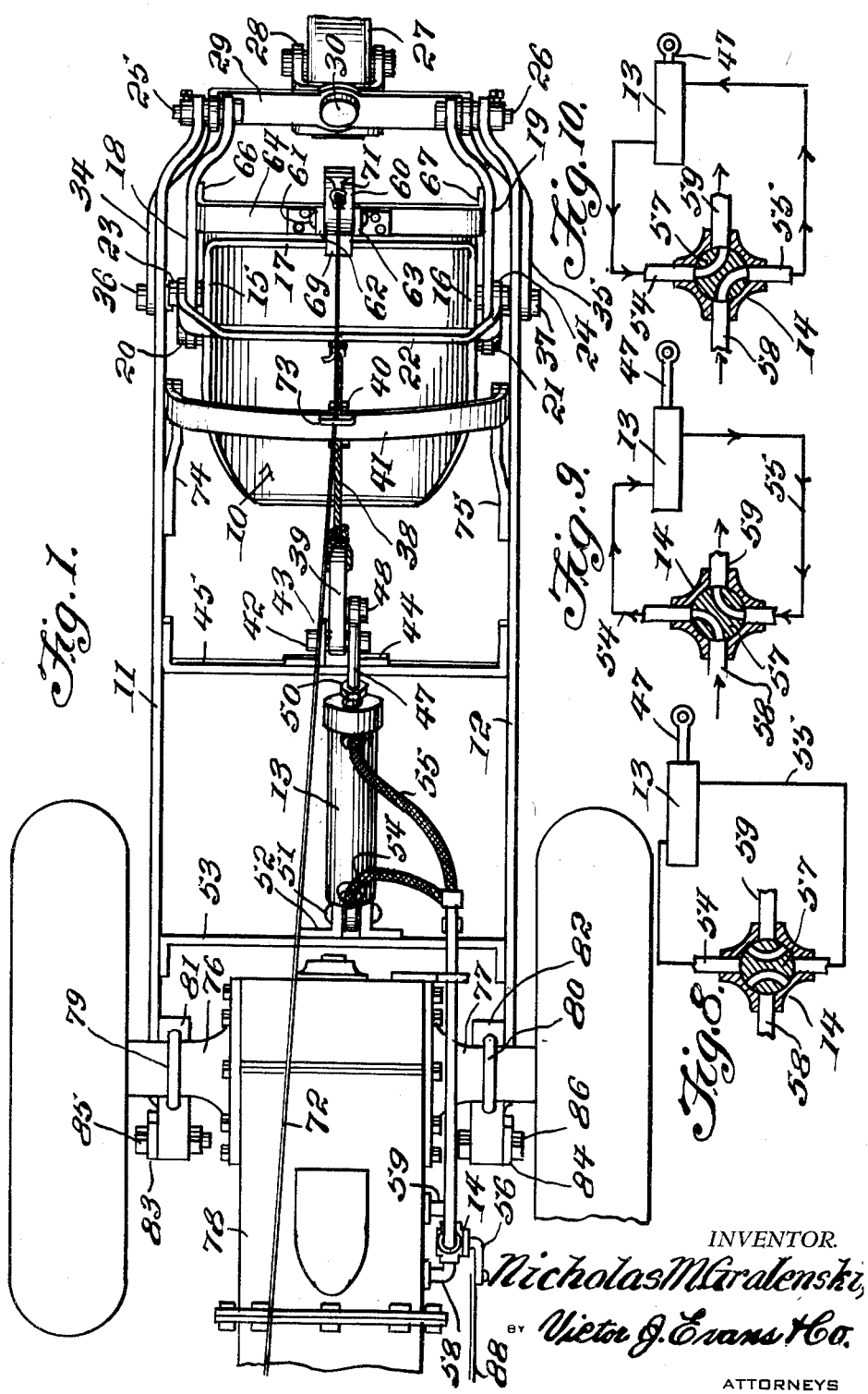
INVENTOR.
Nicholas M. Gralenski,
BY Victor J. Evans & Co.
ATTORNEYS Sept. 15, 1953 N. M. GRALENSKI 2,651,859
TRACTOR DITCH DIGGING ATTACHMENT
Filed Nov. 29, 1950 3 Sheets-Sheet 2
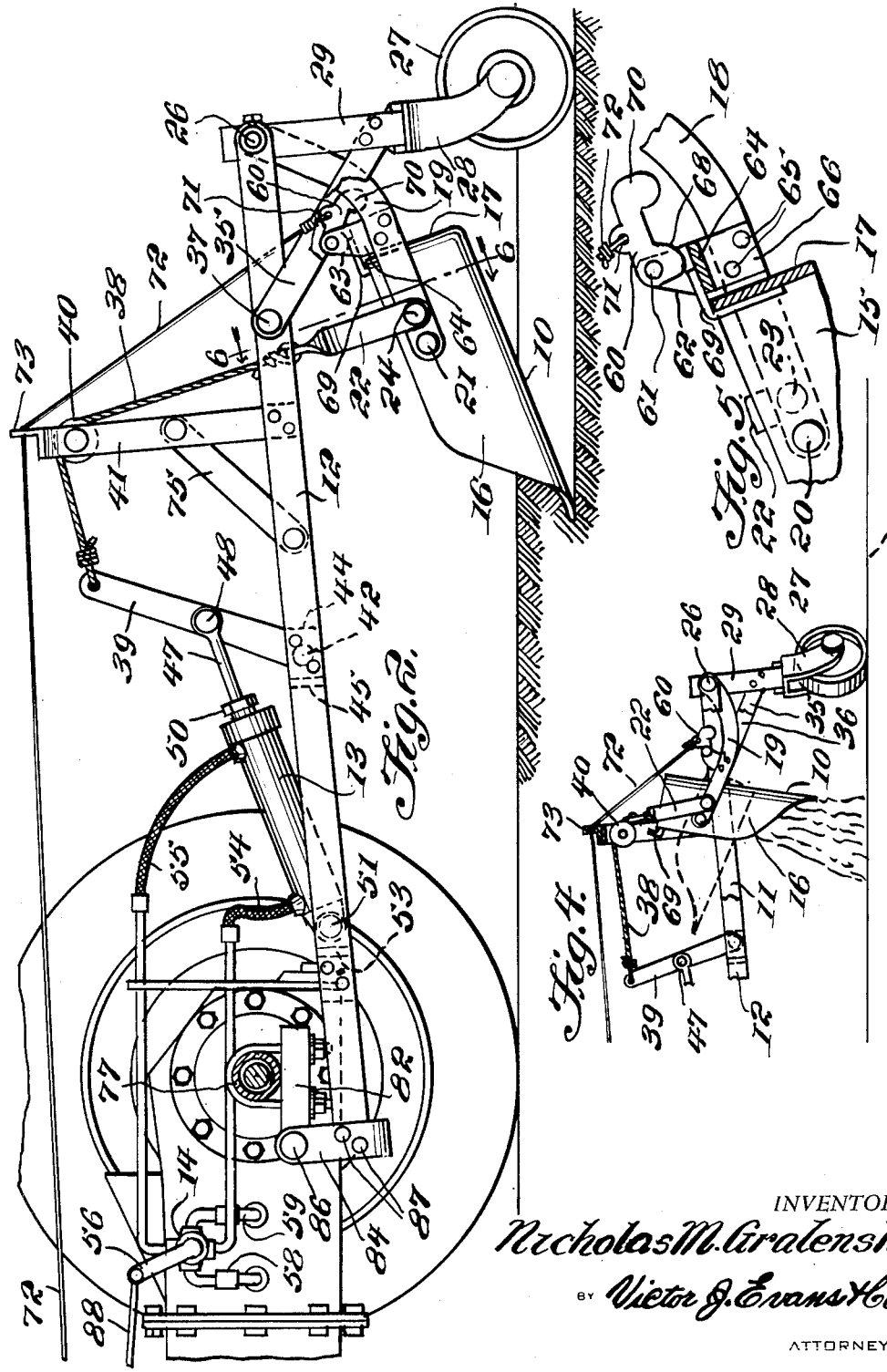
INVENTOR.
*Nicholas M. Gralenski,*
BY *Victor J. Evans & Co.*
ATTORNEYS Sept. 15, 1953 N. M. GRALENSKI 2,651,859
TRACTOR DITCH DIGGING ATTACHMENT
Filed Nov. 29, 1950 3 Sheets-Sheet 3
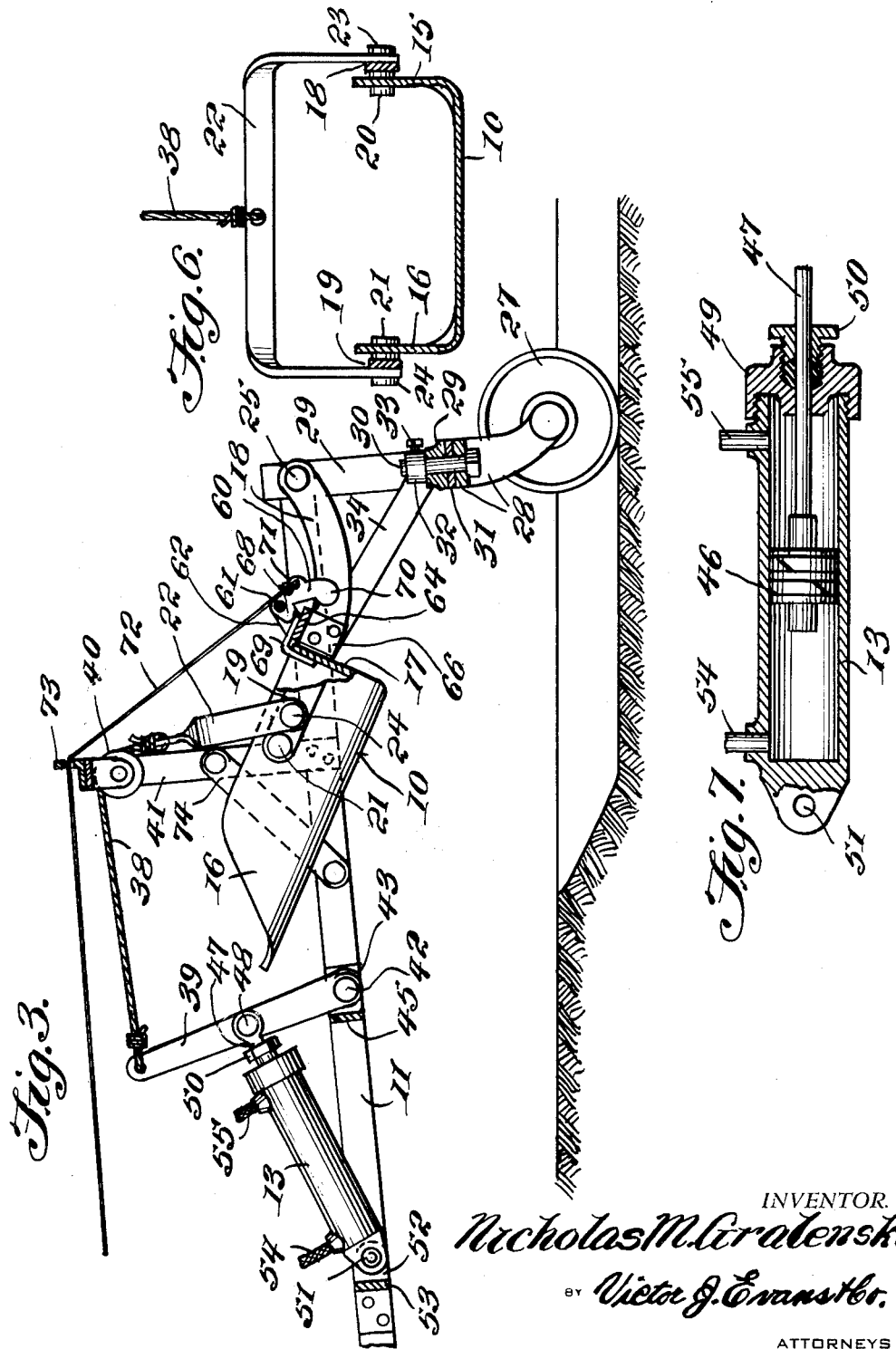
INVENTOR.
Nicholas M. Gralenski,
BY Victor J. Evans & Co.
ATTORNEYS Patented Sept. 15, 1953

2,651,859

UNITED STATES PATENT OFFICE 2,651,859

TRACTOR DITCH DIGGING ATTACHMENT

Nicholas M. Gralenski, Millers Falls, Mass.

Application November 29, 1950, Serial No. 198,137

4 Claims. (Cl. 37—129)

This invention relates to ditch digging machinery and equipment particularly of the type used in combination with tractors, and in particular a scoop pivotally mounted between the outer ends of parallel booms, the forward ends of which are attached to a rear axle housing of a tractor and the trailing ends of which are carried by wheels in a caster mounting and wherein the scoop is controlled by hydraulic means and dumped by a cable actuated latch.

The purpose of this invention is to provide a scoop carrying attachment for tractors in which, after the scoop is filled, it may readily be moved to one side of a trench being formed thereby for dumping.

Various types of ditch and trench digging equipment has been provided, but in devices of this type it is necessary to provide chutes or conveyors for carrying soil to the sides of a trench formed by the device and conveying means of this type, particularly where it is subjected to dumping soil and rocks thereon is comparatively difficult and also costly to service. With this thought in mind this invention contemplates ditch digging equipment whereby the scoop filled with soil, rocks, or the like is readily swung to one side for dumping.

An object of the invention is to provide a scoop carrying attachment for tractors that may readily be applied to tractors now in use without changing the design or construction thereof.

With this and other objects and advantages in view the invention embodies a pair of horizontally disposed parallel booms, means attaching the forward ends of the booms to the rear axle housing of a tractor, means for pivotally mounting arms extended from a scoop in the trailing ends of the booms, hydraulic means for elevating a scoop carried by the arms, a wheel in a caster mounting positioned to support the trailing ends of the booms, and a cable actuated latch for releasing the scoop for dumping.

Other features and advantages of the invention will appear from the following description taken in connection with the drawings wherein:

Figure 1 is a plan view illustrating the attachment extended rearwardly from a tractor.

Figure 2 is a side elevational view showing the ditch digging attachment with a scoop thereof in the scooping position.

Figure 3 is a longitudinal section through the rear portion of the attachment showing the scoop in an elevated position.

Figure 4 is a detail on a smaller scale showing the scoop in a dumping position.

Figure 5 is a detail illustrating the position of the latch with the scoop released for dumping.

Figure 6 is a cross section through the scoop taken on line 6—6 of Fig. 2 illustrating the bale in which the scoop is suspended.

Figure 7 is a longitudinal section through the hydraulic cylinder by which the scoop is elevated.

Figure 8 is a detail showing a section through a typical four-way valve through which fluid under pressure is supplied to the hydraulic cylinder for actuating the scoop, and showing the parts in the neutral or holding position.

Figure 9 is a similar view illustrating the position of the valve core with the scoop being lowered to operative position.

Figure 10 is a similar view showing the position of the core of the valve with the scoop being elevated to the position shown in Fig. 3.

Referring now to the drawings wherein like reference characters denote corresponding parts the ditch digging attachment of this invention includes a scoop 10 pivotally mounted between parallel horizontally disposed booms 11 and 12 and actuated by a hydraulic cylinder 13 by a fluid under pressure supplied to a valve 14.

The scoop 10 is provided with a base having upwardly extended side walls 15 and 16 connected at one end by an end wall 17 and the scoop is mounted in arcuate arms 18 and 19 which are pivotally connected to the side walls of the scoop by pins 20 and 21, to a bale 22 by pins 23 and 24, and to the rearward ends of the booms 11 and 12 by bolts 25 and 26.

The trailing ends of the booms 11 and 12 are supported by a wheel 27 in a caster type yoke 28 that is pivotally mounted in a U-shaped frame 29 by a king pin 30 and the frame 29 is provided with outwardly extended arms that are pivotally mounted on the bolts 25 and 26. A washer 31 is provided between the caster yoke 28 and the horizontal section of the U-shaped frame 29, as shown in Fig. 3. The king pin 30 is provided with a set collar 32 having a set screw 33 therein.

The frame 29 is braced by diagonally positioned braces 34 and 35 that extend upwardly from the sides of the frame 29 to the booms 11 and 12 to which the braces are connected by bolts 36 and 37.

The bale 22, which is pivotally connected to the arms 18 and 19 of the scoop 10 is connected by a cable 38 to a lever 39, with the cable passing over a pulley 40 in an inverted U-shaped brace 41 and the lever 39 is pivotally mounted by a bolt 42 between brackets 43 and 44 on a cross bar 45. The lever 39 is controlled by a piston 46 in the cylinder 13, to which the lever is connected by a piston rod 47 through a pin 48.

It will be understood that the cylinder 13, illustrated in the drawings, is only typical as a hydraulic cylinder of any suitable type may be used. In the design shown the cylinder 13 is provided with a head 49 having a packing gland 50 therein and the cylinder is pivotally mounted by a pin 51 in a bearing 52 on a cross bar 53 that is positioned between the booms 11 and 12. The cylinder is provided with connections 54 and 55 by which fluid is supplied to the opposite end of the cylinder from the valve 14 and with the valve actuated by a hand lever 56 on one end of the core 57 of the valve, fluid may be supplied through a connection 58 to the connections 54 and 55 respectively, as illustrated in Figs. 8, 9 and 10. The valve is also provided with a return connection 59.

The scoop is retained in operative position by a latch 60, pivotally mounted on a pin 61 between ears 62 and 63, on a cross bar 64 that is secured to the arms 18 and 19 by rivets 65 in flanges 66 and 67. The latch 60 is provided with a cam 68 that engages the upper surface of a clip 69 on the upper edge of the rear wall 17 of the scoop, as illustrated in Fig. 5, when the latch is released. A weight 70 is provided on the outer end of the latch and the upper part of the latch is provided with an eye 71 from which a cable 72 extends through the tractor.

The cable 72 extended from the latch 60 extends through an eye 73 on the upper end of the brace 41 and, as illustrated in Figs. 1 and 2 the brace 41 is supported on the booms 11 and 12 by diagonal braces 74 and 75.

The forward ends of the booms 11 and 12 are suspended from the rear axle housing 76 and 77 of a tractor 78 by U-bolts 79 and 80 which clamp bars 81 and 82 to the axle housing and, as illustrated in Fig. 2 hangers 83 and 84 pivotally connected to the ends of the bars 81 and 82 by bolts 85 and 86, respectively, are secured to the ends of the booms by rivets, as indicated by the numeral 87.

With the parts arranged in this manner the position of the scoop is controlled by a rod 88 extended from the lever 56 of the valve 14 and with pressure applied to a forward end of the hydraulic cylinder 13 through the connection 54, piston 47 moves the lever 39 rearwardly so that the scoop is in the position shown in Fig. 2. When the scoop is filled with soil it is carried forwardly to clear the ground and the lever 56 is then actuated so that pressure is applied to the opposite end of the cylinder 13 through the connection 55 whereby the lever 39 is drawn forwardly to the position shown in full lines in Figure 3. In this position the scoop is elevated to carrying position and the tractor may be turned to thereby move the scoop to one side of the trench and while in this position the cable 72 is drawn forwardly to release the latch 60 whereby the scoop is dumped, as illustrated in Figure 4. After the scoop is dumped the tractor and scoop are returned to a position where the scoop is aligned with the trench and the operation is repeated.

It will be understood that modifications may be made in the design and arrangement of the parts without departing from the spirit of the invention.

What is claimed is:

1. A tractor trench digging attachment comprising a tractor having a rear axle housing, a pair of booms, means pivotally attaching the forward ends of the booms to the said rear axle housing of the tractor, a wheel carried by a caster mounting pivotally mounted on the extended ends of the booms, arms pivotally mounted on the said extended ends of the booms, a scoop pivotally mounted on said arms, a latch carried by the arms for retaining the scoop in a scooping position, a lever pivotally mounted on a cross-bar fixed between the booms, a hydraulic cylinder pivotally mounted on a cross-bar fixed between the booms, said cylinder having a piston rod connected to the said lever, a brace mounted on the booms, a pulley journaled on the brace, a bail pivotally mounted on the arms between which the scoop is carried, a cable trained over the pulley on the brace connecting the bail to the lever, and means actuating the latch from the tractor for releasing the scoop for dumping.

2. A tractor trench digging attachment comprising a tractor having a rear axle housing, a pair of booms, means pivotally attaching the forward ends of the booms to the said rear axle housing of the tractor, a wheel carried by a caster mounting pivotally mounted in the extended ends of the booms, arms pivotally mounted on the said extended ends of the booms, a scoop pivotally mounted on the said arms, a latch carried by the arms for retaining the scoop in a scooping position, a lever pivotally mounted on a cross-bar fixed between the booms, a hydraulic cylinder pivotally mounted on a cross-bar fixed between the booms, said cylinder having a piston rod connected to the said lever, a brace mounted on the booms, a pulley journaled on the brace, a bail pivotally mounted on the arms between which the scoop is carried, a cable trained over the pulley on the brace connecting the bail to the lever, a cross bar connecting the said scoop carrying arms and on which the latch is mounted, a clip extended from the rear wall of the scoop over the cross bar connecting the said arms and positioned to be engaged by a cam surface of the latch with the latch holding the scoop in the scooping position, and a cable extended from the latch to a point on the tractor for actuating the latch to releasing position.

3. In a scoop attachment for a tractor, the combination which comprises a tractor having a rear axle housing, a pair of parallel substantially horizontally disposed booms extended rearwardly from the tractor, means pivotally mounting the forward ends of the booms on the said rear axle housing, a wheel journaled in a caster mounting pivotally mounted on the rear ends of the booms, forwardly extended parallel arms also pivotally mounted on the rear ends of the booms, a cross bar extended across and connecting the said parallel arms, cross bars extended between the booms, a scoop pivotally mounted in the forward ends of the said arms, a bail extended from the said arms upwardly above the scoop, a brace extended upwardly above the booms, a lever pivotally mounted on one of the cross bars between the booms, a hydraulic cylinder carried by the booms for actuating the said lever, a cable connecting the end of the lever to the bale of the scoop, and a latch pivotally mounted on the cross bar between the said arms for retaining the scoop in scooping position.

4. In a scoop attachment for a tractor, the combination which comprises a tractor having a rear axle housing, a pair of parallel substantially horizontally disposed booms extended rearwardly from the tractor, means pivotally mounting the forward ends of the booms on the said rear axle housing, a wheel journaled in a caster mounting pivotally mounted on the rear ends of the booms, forwardly extended parallel arms also pivotally mounted on the rear ends of the booms, a cross bar extended across and connecting the said parallel arms, cross bars extended between the booms, a scoop pivotally mounted in the forward ends of the said arms, a bail extended from the said arms upwardly above the scoop, a brace extended upwardly above the booms, a lever pivotally mounted on one of the cross bars between the booms, a hydraulic cylinder carried by the booms for actuating the said lever, a cable connecting the end of the lever to the bail of the scoop, an arm extended rearwardly from the scoop and positioned on the said cross bar between the arms, a latch having a cam on one end thereof pivotally mounted on the said cross bar between the arms and positioned to engage a clip on the scoop for locking the scoop in operative position, said latch having a weight on the opposite end for retaining the cam in the position of holding the scoop in the operative position, and a cable extended from the latch for operating the latch to a releasing position from a remote point.

NICHOLAS M. GRALENSKI.

References Cited in the file of this patent

UNITED STATES PATENTS

| Number | Name | Date |
|---|---|---|
| 740,909 | Patterson | Oct. 6, 1903 |
| 1,819,544 | Dech | Aug. 18, 1931 |
| 2,386,192 | Brimhall | Oct. 9, 1945 |